US008823758B2

(12) United States Patent  
Chait et al.

(10) Patent No.: US 8,823,758 B2
(45) Date of Patent: Sep. 2, 2014

(54) SYSTEMS AND METHODS FOR PROCESSING EGGS

(75) Inventors: Mitchell Barry Chait, Las Vegas, NV (US); Allan Irwin Brown, Beverly Hills, CA (US); Marco Armand Hegyi, Laguna Niguel, CA (US); Greg Anderson, Kissimmee, FL (US)

(73) Assignee: TEN Media, LLC, Beverly Hills, CA (US)

( * ) Notice: Subject to any disclaimer, the term of this patent is extended or adjusted under 35 U.S.C. 154(b) by 158 days.

(21) Appl. No.: 12/690,898

(22) Filed: Jan. 20, 2010

(65) Prior Publication Data

US 2011/0175974 A1    Jul. 21, 2011

(51) Int. Cl.
*B41J 3/407* (2006.01)

(52) U.S. Cl.
CPC ................................. *B41J 3/4073* (2013.01)
USPC .......................................................... 347/224

(58) Field of Classification Search
USPC .................................. 347/224, 225; 119/50.7
See application file for complete search history.

(56) References Cited

U.S. PATENT DOCUMENTS

| | | |
|---|---|---|
| 1,796,872 A | 3/1931 | Markey et al. |
| 1,906,094 A | 4/1933 | Powell |
| 2,039,486 A | 5/1936 | Lincoln |
| 2,061,065 A | 11/1936 | De Reamer |
| 2,080,122 A | 3/1937 | Ford et al. |
| 2,843,026 A | 7/1958 | M. Burger |
| 2,843,304 A | 7/1958 | Reifers |
| 3,094,920 A | 6/1963 | Priesmeyer |
| 3,242,008 A | 3/1966 | Kurtz |
| 3,244,349 A | 4/1966 | Randles, Jr. |
| 3,392,414 A | 7/1968 | Cathcart et al. |
| 3,501,083 A | 3/1970 | Lake |
| 3,548,435 A | 12/1970 | Comber et al. |
| 3,556,387 A | 1/1971 | Trimble |
| 3,567,107 A | 3/1971 | Artz |
| 3,595,164 A | 7/1971 | Hovekamp |
| 3,598,300 A | 8/1971 | Katz |
| 3,625,413 A | 12/1971 | Medendorp |

(Continued)

FOREIGN PATENT DOCUMENTS

| | | |
|---|---|---|
| CA | 665 927 A | 7/1963 |
| DE | 247831 | 7/1987 |

(Continued)

OTHER PUBLICATIONS

Durand-Wayland Labeling Systems, http://www.durand-wayland.com/label/8/7/2006.

(Continued)

*Primary Examiner* — Huan Tran
(74) *Attorney, Agent, or Firm* — Wolf, Greenfield & Sacks, P.C.

(57) ABSTRACT

A system for laser marking eggs is disclosed comprising multiple laser marking apparatuses and a central server. The laser marking apparatuses are configured and arranged to perform laser marking jobs queued by local computers for laser marking eggs being packed by egg packing stations. The central server is configured to distribute the laser marking jobs to the local computers. In addition, a method is disclosed for controlling laser marking jobs which comprises distributing the laser marking jobs from a central computer to local computers responsible for queuing laser marking jobs to one or more laser marking apparatuses configured and arranged to laser mark information on eggs.

22 Claims, 11 Drawing Sheets

(56) References Cited

U.S. PATENT DOCUMENTS

| | | |
|---|---|---|
| 3,661,320 A | 5/1972 | Donaldson |
| 3,670,952 A | 6/1972 | Venuti et al. |
| 3,712,532 A | 1/1973 | Alroy |
| 3,730,420 A | 5/1973 | Burkett |
| 3,767,103 A | 10/1973 | Reifers |
| 3,779,159 A | 12/1973 | Rose et al. |
| 3,817,441 A | 6/1974 | Jackson |
| 3,848,730 A | 11/1974 | Niederer et al. |
| 3,916,143 A | 10/1975 | Farrell |
| 3,917,152 A | 11/1975 | Burkett |
| 3,950,208 A | 4/1976 | Pavuk et al. |
| 4,043,105 A | 8/1977 | Cochran |
| 4,081,123 A | 3/1978 | Reifers |
| 4,189,898 A | 2/1980 | Moulds et al. |
| 4,195,736 A | 4/1980 | Loeffler |
| 4,240,575 A | 12/1980 | Tange |
| 4,382,536 A | 5/1983 | Congleton |
| 4,394,214 A | 7/1983 | Bixler et al. |
| 4,419,068 A | 12/1983 | Congleton |
| 4,448,344 A | 5/1984 | Lord et al. |
| 4,480,781 A | 11/1984 | Emery et al. |
| 4,505,373 A | 3/1985 | Thomas |
| 4,519,494 A | 5/1985 | McEvoy et al. |
| 4,519,505 A | 5/1985 | Thomas |
| 4,569,444 A | 2/1986 | McEvoy et al. |
| 4,575,993 A | 3/1986 | Meyn |
| 4,578,329 A | 3/1986 | Holsappel |
| 4,636,043 A | 1/1987 | Bellar |
| 4,652,722 A | 3/1987 | Stone et al. |
| 4,720,618 A | 1/1988 | Stamer et al. |
| 4,727,235 A | 2/1988 | Stamer et al. |
| 4,750,316 A | 6/1988 | Bliss |
| 4,795,080 A | 1/1989 | McIntyre |
| 4,839,181 A | 6/1989 | MacMurray |
| 4,843,958 A | 7/1989 | Egosi |
| 4,872,608 A | 10/1989 | Lake |
| 4,900,617 A | 2/1990 | Smith |
| 5,021,631 A | 6/1991 | Ravellat |
| 5,102,034 A | 4/1992 | Amabili |
| 5,120,631 A | 6/1992 | Kanbayashi et al. |
| 5,120,928 A | 6/1992 | Piliero |
| 5,142,976 A | 9/1992 | Roulleau |
| 5,164,009 A | 11/1992 | Chandler |
| 5,198,843 A | 3/1993 | Ito |
| 5,316,397 A | 5/1994 | Robertson et al. |
| 5,321,491 A | 6/1994 | Summers et al. |
| 5,335,003 A | 8/1994 | Sugden |
| 5,477,179 A | 12/1995 | Takada et al. |
| 5,478,990 A | 12/1995 | Montanari et al. |
| 5,494,164 A | 2/1996 | Ramirez |
| 5,526,119 A | 6/1996 | Blit et al. |
| 5,608,429 A | 3/1997 | Hayashihara et al. |
| 5,653,900 A | 8/1997 | Clement et al. |
| 5,660,747 A | 8/1997 | Drouillard et al. |
| 5,691,757 A | 11/1997 | Hayashihara et al. |
| 5,767,477 A | 6/1998 | Sutter, Jr. |
| 5,792,807 A | 8/1998 | Hayashihara et al. |
| 5,798,843 A | 8/1998 | Yamamoto et al. |
| 5,835,911 A | 11/1998 | Nakagawa et al. |
| 5,897,797 A | 4/1999 | Drouillard et al. |
| 5,928,842 A | 7/1999 | Shinmoto et al. |
| 6,029,424 A | 2/2000 | McEvoy et al. |
| 6,056,341 A | 5/2000 | Bliss |
| 6,154,738 A | 11/2000 | Call |
| 6,180,914 B1 | 1/2001 | Jones et al. |
| 6,421,159 B1 | 7/2002 | Sutter et al. |
| 6,429,889 B1 | 8/2002 | Murokh |
| 6,584,982 B1 | 7/2003 | Clay et al. |
| 6,678,094 B2 | 1/2004 | Sator |
| 6,732,928 B1 | 5/2004 | Lawlor |
| 6,791,592 B2 | 9/2004 | Assa et al. |
| 6,796,241 B2 | 9/2004 | Catalan et al. |
| 6,810,796 B2 | 11/2004 | Catalan et al. |
| 6,829,000 B2 | 12/2004 | Assa et al. |
| D525,535 S | 7/2006 | Rathbone |
| 7,255,231 B2 | 8/2007 | Andrews et al. |
| 7,258,234 B2 | 8/2007 | Aardema et al. |
| 7,353,951 B2 | 4/2008 | Vovan |
| 7,951,409 B2 | 5/2011 | Parker |
| 8,084,712 B2 | 12/2011 | Griffiths et al. |
| 8,148,259 B2 | 4/2012 | Arai et al. |
| 8,455,026 B2 | 6/2013 | Chait et al. |
| 8,455,030 B2 | 6/2013 | Chait et al. |
| 8,499,718 B2 | 8/2013 | Chait et al. |
| 8,544,739 B2 | 10/2013 | Parker |
| 8,657,098 B2 | 2/2014 | Chait et al. |
| 8,715,757 B2 | 5/2014 | Chait et al. |
| 2001/0030179 A1 | 10/2001 | Knieb et al. |
| 2002/0011311 A1 | 1/2002 | Carignan et al. |
| 2002/0179580 A1 | 12/2002 | Costin |
| 2003/0080191 A1 | 5/2003 | Lubow et al. |
| 2003/0200300 A1 | 10/2003 | Melchione |
| 2003/0206227 A1 | 11/2003 | Assa et al. |
| 2003/0226835 A1 | 12/2003 | Bell et al. |
| 2004/0003342 A1* | 1/2004 | Keane et al. ............... 715/500 |
| 2004/0088348 A1 | 5/2004 | Yeager et al. |
| 2004/0130612 A1 | 7/2004 | Assa et al. |
| 2004/0220855 A1 | 11/2004 | Carignan et al. |
| 2005/0226975 A1 | 10/2005 | Drouillard |
| 2006/0012821 A1 | 1/2006 | Franklin et al. |
| 2006/0087686 A1 | 4/2006 | Anderson |
| 2006/0138105 A1 | 6/2006 | Parker |
| 2006/0251769 A1 | 11/2006 | Rathbone |
| 2007/0108092 A1 | 5/2007 | Minuto et al. |
| 2008/0223834 A1 | 9/2008 | Griffiths et al. |
| 2008/0279991 A1 | 11/2008 | Kwon |
| 2009/0020395 A1 | 1/2009 | Accettura |
| 2011/0174223 A1* | 7/2011 | Chait et al. ............... 119/50.7 |
| 2011/0176901 A1 | 7/2011 | Chait et al. |
| 2011/0177206 A1 | 7/2011 | Anderson et al. |
| 2011/0177207 A1 | 7/2011 | Chait et al. |
| 2011/0177208 A1* | 7/2011 | Chait et al. ............... 426/87 |
| 2011/0177217 A1 | 7/2011 | Chait et al. |
| 2011/0258171 A1 | 10/2011 | Parker |
| 2012/0114820 A1 | 5/2012 | Griffiths et al. |
| 2012/0180436 A1 | 7/2012 | Chait et al. |
| 2013/0017296 A1 | 1/2013 | Chait et al. |
| 2013/0212981 A1 | 8/2013 | Chait et al. |
| 2014/0057028 A1 | 2/2014 | Chait et al. |

FOREIGN PATENT DOCUMENTS

| | | |
|---|---|---|
| DE | 3601913 | 7/1987 |
| DE | 3722176 | 1/1989 |
| DE | 3836821 | 5/1990 |
| DE | 0291471 A5 | 7/1991 |
| DE | 4125007 | 1/1993 |
| DE | 4322252 | 1/1995 |
| DE | 010109109 | 10/2001 |
| EP | 0 160 741 A2 | 11/1985 |
| EP | 0421837 | 4/1991 |
| EP | 0684144 | 11/1995 |
| EP | 0908313 A2 | 4/1999 |
| EP | 2 319 653 | 5/2011 |
| ES | 2033185 | 4/1994 |
| FR | 2 589 448 A1 | 5/1987 |
| FR | 2621529 | 4/1989 |
| FR | 2654662 | 5/1991 |
| GB | 2131767 A | 6/1984 |
| JP | 55034966 | 3/1980 |
| JP | 58-090985 | 5/1983 |
| JP | 61206692 | 9/1986 |
| JP | 1108940 | 4/1989 |
| JP | 1196259 | 8/1989 |
| JP | 2-60552 | 3/1990 |
| JP | 3211068 | 9/1991 |
| JP | 5-146887 A2 | 6/1993 |
| JP | 7011183 | 1/1995 |
| JP | 2000168157 | 6/2000 |
| JP | 2001136859 | 5/2001 |
| WO | WO 01/15678 | 3/2001 |
| WO | WO 01/56789 | 8/2001 |
| WO | WO 2004/006453 A2 | 8/2004 |
| WO | WO 2004/086166 A2 | 10/2004 |

(56) References Cited

FOREIGN PATENT DOCUMENTS

| WO | WO 2007/087116 A2 | | 8/2007 |
|----|-------------------|---|--------|
| WO | WO 2008-115367 A2 | | 9/2008 |
| WO | WO 2011/091011 | * | 7/2011 |

OTHER PUBLICATIONS

European Search Report from related application, PCT/US 08/03160, mailed Aug. 12, 2008.
Horenstein, How Lasers Could Print Ads on Food, Daily Mail, Mar. 4, 1999.
Stiles, Laser Labeling, Mail Tribune Sep. 19, 2004.
International Search Report for International Application No. PCT/US2011/021680, mailed May 11, 2011 (2 pages).
International Search Report and Written Opinion for International Application No. PCT/US2011/021680 mailed Jul. 12, 2011.
International Preliminary Examination Report of Application PCT/US2011/021680 mailed on Feb. 20, 2012.
Written Opinion of the International Preliminary Examining Authority of Application PCT/US2011/021680 mailed on May 29, 2012.
Examiner's report No. 2 on patent application No. AU2005294770 mailed on May 24, 2012.
International Preliminary Report on Patentability of Application PCT/US2011/021680 mailed on Jul. 25, 2012.
"25 Eggs With Sharpie Faces." Holytaco. Jan. 12, 2010. Availabe at http://www.holytaco.com/25-egg-sharpie-faces/. Last accessed Feb. 19, 2014. 20 pages.
"Easter Eggs Gone Wild! (fun ways to decorate eggs." Apr. 2009. Available at http://oneshetwoshe.com/2009/04/easter-eggs-gone-wild-fun-ways-to-decorate.html. Last accessed Feb 18, 2014. 9 pages.
"Easter on the Net: Easter Eggs." 2008. Available at http://web.archive.org/web/20080409214130/http://www.holidays.net/easter/eggs.htm. Last accessed Feb. 18, 2014. 5 pages.
International Search Report and Written Opinion for International Application No. PCT/US2013/026888, mailed May 23, 2013.

* cited by examiner

SYSTEMS AND METHODS FOR PROCESSING EGGS

RELATED APPLICATIONS

This application is related to U.S. application Ser. Nos. 12/690,859, 12/690,872, 12/690,876, 12/690,886, 12/690,890, and 12/690,896, respectively, filed on even date herewith. The entire content of each of the foregoing applications is incorporated herein by reference.

FIELD

The inventions described herein relate generally to the field of food product processing. Some described embodiments relate particularly to systems and techniques for laser marking or otherwise processing eggs.

BACKGROUND

Eggs typically undergo a great deal of processing before they are ready to be sold to the consuming public. In many circumstances, for example, eggs pass through several processing stations at which they are washed, candled, weighed, graded, and packed into packages (e.g., cartons, crates, or other commercially distributed containers). Examples of such processing stations and mechanisms for conveying eggs from station to station are described, for instance, in the following U.S. patents assigned to Diamond Automations, Inc.: U.S. Pat. Nos. 4,189,898; 4,195,736; 4,505,373; 4,519,494; 4,519,505; 4,569,444; 4,750,316; 5,321,491; and 6,056,341, the entire contents of each of which are incorporated herein by reference. It is not uncommon for a facility in which these stations operate to output about one million eggs in a single day. Accordingly, to be commercially acceptable, the throughput of the stations needs to be quite high, with some stations typically processing on the order of 20,000 eggs per hour.

Because eggs are a perishable item susceptible to spoilage, egg packages typically (and often by law or regulation) have expiration dates marked on them. Many consumers, however, move eggs from their packages into special receptacles in their refrigerators. When this is done, the consumer is no longer able to evaluate the expiration date of individual eggs prior to using them.

Furthermore, certain governmental bodies, e.g., the United States Food and Drug Administration (FDA), the United States Department of Agriculture (USDA), and various state governments, currently do not allow retailers to "repack" eggs, i.e., to move eggs from one package to another. This restriction can result in tremendous waste because whenever the integrity of even a single egg in a package in the hands of a retailer is compromised (e.g., is broken), the entire package of eggs must be discarded.

Several techniques for marking individual eggs with expiration dates and the like have been proposed. One such approach is to use vegetable dyes or other water-soluble ink products to mark eggs. Such products, however, have a tendency to leak into the interior of eggs and can result in undesirable ink spots within them. The tendency of such products to wash off or fade also means that such marking are susceptible to tampering and even unintentional loss of integrity (e.g., dripping and smearing from condensation and handling), and has generally limited their acceptance.

It is also known to use lasers to mark indicia onto perishable products for the purpose of tracking their pedigree and/or integrity (e.g., using date codes and/or traceability codes), as well as for allowing textual or graphical advertising messages to be disseminated via such products. An example of a system for laser marking such information on hen eggs is described, for example, in U.S. Patent Application Publication No. 2008/0223834 ("the '834 Application"), published on Sep. 18, 2008. The disclosure of the '834 Application is incorporated herein by reference in its entirety.

The approach described in the '834 Application is to laser mark information on eggs as they are conveyed at high speed during the grading process. Although this approach has proven effective for certain applications, the extremely high throughput of the grading machines, the lack of uniformity in the moisture content of the surface of individual eggs during the grading process, and the significant amount of dust created during the laser marking process, among other things, have made it challenging to mark individual eggs with sufficient accuracy, reliably and consistency for certain purposes.

SUMMARY

A method for laser marking eggs is disclosed which comprises using a machine vision system to monitor laser marking of eggs by a laser marking system, and adjusting one or more parameters of the laser marking system based upon determinations made by the machine vision system.

Additionally, a system for laser marking eggs is disclosed which comprise a machine vision system and one or more control elements. The machine vision system is configured and arranged to monitor laser marking of eggs by a laser marking system, and the one or more control elements are configured and arranged to adjust one or more parameters of the laser marking system based upon determinations made by the machine vision system.

Further, a system for laser marking eggs is disclosed comprising multiple laser marking apparatuses and a central server. The laser marking apparatuses are configured and arranged to perform laser marking jobs queued by local computers for laser marking eggs being packed by egg packing stations. The central server is configured to distribute the laser marking jobs to the local computers.

In addition, a method is disclosed for controlling laser marking jobs which comprises distributing the laser marking jobs from a central computer to local computers responsible for queuing laser marking jobs to one or more laser marking apparatuses configured and arranged to laser mark information on eggs.

DETAILED DESCRIPTION OF PREFERRED EMBODIMENTS

Figure 1:
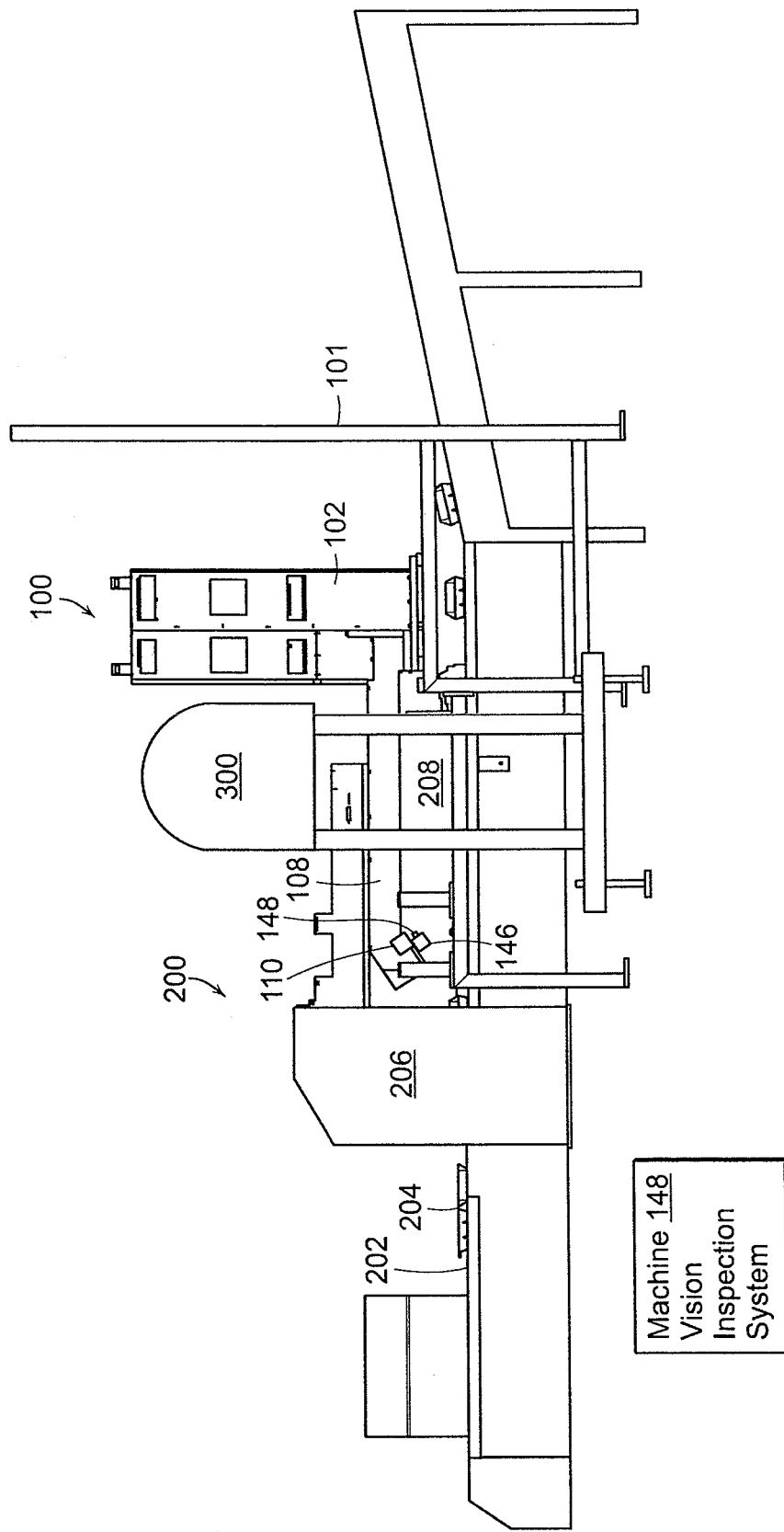
FIG. 1 is a side-view of an illustrative example of a laser marking apparatus embodying various features of the invention, configured to be operational with a conventional egg packing apparatus.

We have recognized that laser marking eggs "on the fly" at high speeds, e.g., while the eggs are in motion through a grading station at speeds of typically about 100 to 300 feet per minute (fpm), can produce a less-than-ideal result in some circumstances in terms of marking quality and reliability. "Reliability," in this context, refers to the percentage of eggs processed by the system that have clear, legible, and consistent markings on them (whether evaluated objectively or subjectively). For example, we have recognized that in order for a means of marking eggs with indicia suitable for repacking purposes to be both widely commercially viable and economically feasible, it is important for a large percentage of the eggs processed to have clear, legible, consistent markings. One reason for this is that, in many circumstances, eggs that are mismarked with such indicia must be discarded for one reason or another.

In addition, we have observed, for example, that the limited window of time and finite space available for accessing and laser marking an egg using on-the-fly techniques typically permits only a limited amount of information to be laser marked on the egg in a direction extending along the egg's long axis. The inherent lack of accuracy in tracking a high-speed moving target, as well as the orientation, inevitable vibrations, and other motion within such a moving mechanical system, can further compromise the quality of the resulting image and render it insufficient for certain purposes. Moreover, our experience has shown that attempting to laser mark eggs during the grading process can be problematic for some applications because a typical process involves washing the eggs shortly before attempting to laser mark indicia onto them. The resulting lack of uniformity in the dryness of the surface of the eggs can result in inaccurate or uneven markings. Laser marking complex information, e.g., an intricate company logo, during the grading process can be particularly problematic for the foregoing reasons.

In addition, the dust generated during the laser marking process can cause problems for both local (i.e., at the laser marking station) and downstream components. While vacuuming away excess dust can be performed, it has proven difficult in practice to accomplish effectively.

Furthermore, when eggs are marked at a particular location, e.g., on their sides, before they reach the packer, there is a risk that the packer will put the eggs into the package in an orientation that precludes or obscures visibility. Accordingly, eggs marked by components upstream of the packer frequently are packed in such a way that the marked indicia on the egg will be hidden unless and until the egg is repositioned so as to be properly oriented for clear visibility of the marking.

Additionally, when eggs are marked before they reach a packer, the ability to redirect the eggs to a needed location after they have been marked is restricted. That is, once eggs have been marked in particular way, they can be directed only to packers that are processing eggs consistent with the markings that were marked on them. For example, once an egg has been marked with a manufacturer's logo, that egg cannot thereafter be directed to a packer responsible for packing eggs for a different manufacturer.

Significantly, we have found that integrating a laser marking process into an egg packing apparatus, rather than an upstream component such as a grading station, involves a different set of constraints and can produce substantial benefits. In particular, we have determined that laser marking eggs in a packing apparatus, after they have been placed into packages, can alleviate at least some, and perhaps even all, of the various drawbacks of the grader-based laser marking process discussed above. Indeed, we have observed in practice that an embodiment of the system described herein can result in a large improvement in laser marking quality and reliability over a grader-based system. Moreover, it allows laser marking on much more of the eggs' surfaces and can do so without slowing down egg processing.

In some embodiments, a continuous conveyor that carries filled packages of eggs may slow or stop periodically as each new row of each new package of eggs is loaded. Advantageously, the eggs in a loaded package may be laser marked during one or more of the periods (after the loading period) during which the package is held stationary as the rows of eggs are loaded into another upstream package. One or more sensors (e.g., photo eyes) and/or conveyor motion monitors (e.g., a monitor that counts ticks of a conveyor belt) may be used to determine precisely when a loaded package of eggs has moved into position to be lased. The accuracy of the laser marking can therefore be increased considerably simply because the eggs remain stationary during the lasing operation. In other embodiments, the conveyor may carry packed packages of eggs at a somewhat continuous rate in front of the laser-aiming mirrors (aka "galvos"). In such embodiments, a combination of sensors and conveyor motion monitors may be used to accurately track the position of the respective eggs during the lasing process.

In some embodiments, multiple galvos may be used to laser mark the eggs in each package that passes by a laser marking station. In addition, packages of eggs typically advance on a conveyor of a packer at but a small fraction of the rate at which individual eggs move through an upstream grader. As such, using the implementations described herein, a significantly longer window of time may be available for each galvo to laser mark each individual egg. This additional available marking time may allow the galvos to increase the marking quality (e.g., contrast) significantly.

Another potential benefit to laser marking eggs in packages is that the eggs may be manipulated so as to be oriented in the packages in a particular (uniform) manner in advance of the lasing process. For example, in some embodiments, eggs in the packages on the conveyor of a packer may be manipulated so that all of the eggs are centered and tilted slightly backwards, uniformly. As such, a relatively large surface area of the egg will be immediately visible to a consumer (or an inspector, vendor, or other person) who opens the package. By so orienting the eggs in the package prior to the lasing process, the amount of "visible" surface area made available to the laser, for marking, may be increased. In addition, the information that is actually marked on the eggs (expiration dates, tracking codes, advertisements, etc.) will be readily communicated to the consumer (or an inspector, vendor, or any other person who might subsequently open the package) immediately upon opening the package. As an example, a consumer opening a carton of eggs may immediately be presented with neatly arranged, uniformly oriented rows of eggs, each having information such as a company's logo and/or an expiration date prominently displayed at the same location and directly facing the customer.

In addition to the above, laser marking eggs after they have been placed in packages can further be advantageous because of the limited number of components located downstream of the laser marking station and the reduced likelihood that the dust created during the laser marking process will interfere with the operation of any mechanical or optical components. In some embodiments, for example, the only operation performed by the packer following the laser marking process described herein is the closing of the package. Any dust generated by the laser marking process that escapes the vacuuming process described below (if employed) is unlikely to have a significant adverse affect on the operation of the package closing station.

Furthermore, laser marking eggs after they have been placed in packages minimizes the risk that the marked section of the egg will end up hidden from view by a consumer opening the package. That is, when an egg is marked prior to being put in a package, there is a good chance that the egg will be placed in the package by the packer in such a way that the image marked on the egg will be obscured or not visible at all unless the egg is rotated, flipped end-to-end, or otherwise reoriented. Laser marking eggs after they have been placed in packages can minimize the risk that an egg will be so oriented when a consumer (or anyone else) opens a given package.

Additionally, laser marking eggs after they have reached a particular packer ensures that only the eggs being processed by that packer will be marked with the desired information. Accordingly, laser marking eggs after they have been placed in packages allows eggs to be directed to any of numerous packers, or perhaps redirected to a different packer, at any time, without a concern that a given packer will receive an egg with inappropriate or unintended markings.

An example of a laser marking apparatus embodying various inventive features described herein is illustrated in FIGS. 1-4. In the example shown, a laser marking apparatus 100 is configured to be retrofit onto an existing egg packing apparatus 200, for example, of a type manufactured by Diamond Automations, Inc. It should be appreciated, however, that one or more, or perhaps even all, of the components of the laser marking apparatus 100 may additionally or alternatively be integrated into an egg packing apparatus such as that shown at the time of its manufacture. Additionally, it should be appreciated that the egg packing apparatus shown is but one example of an apparatus with which aspects of the invention may be employed and that various features of the invention may additionally or alternatively be employed in connection with any of a number of different types of apparatuses.

Figure 2:
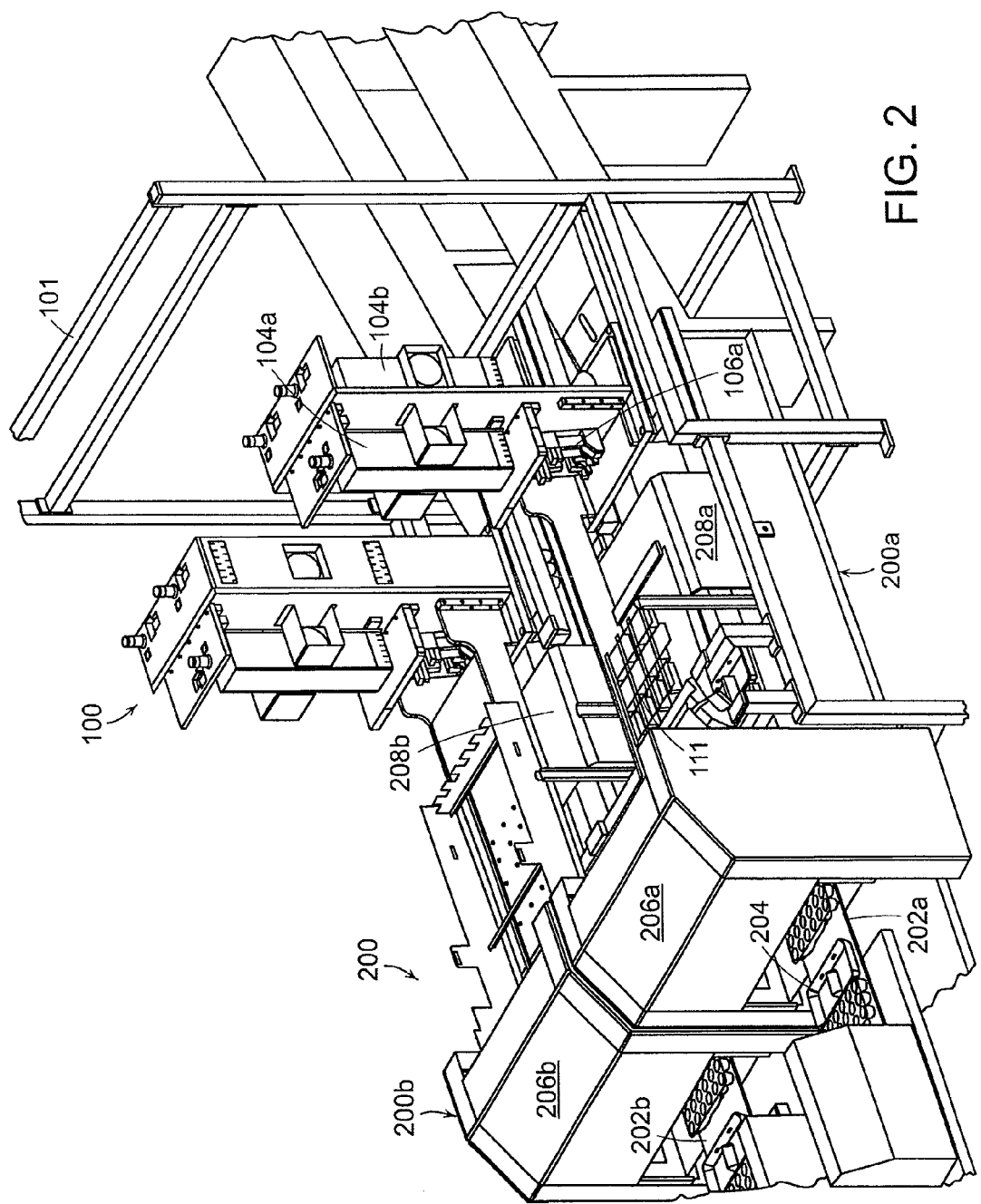
FIGS. 2-4 are partially cut-away, perspective views of various components of the system shown in FIG. 1.
Figure 3:
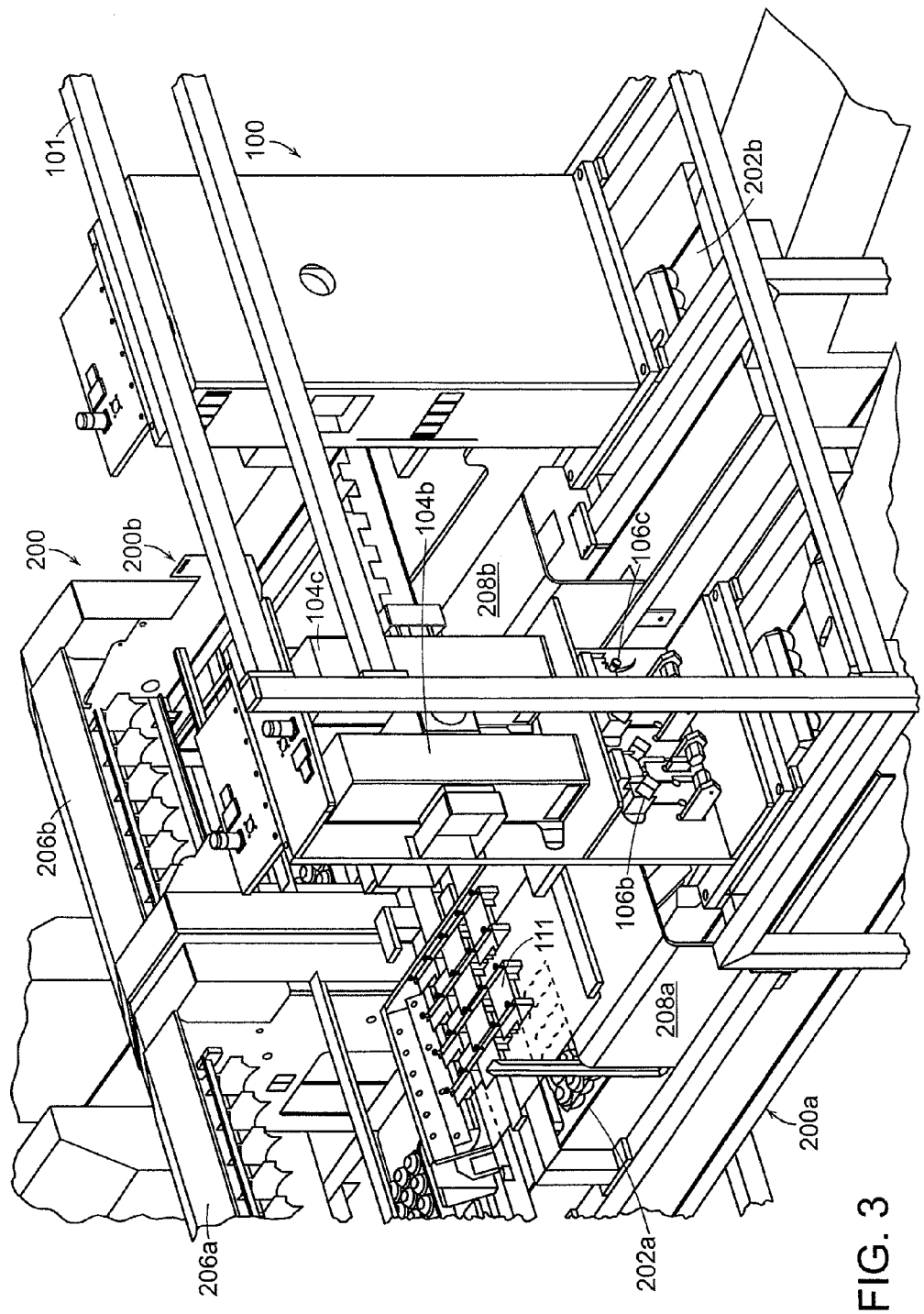
Figure 4:
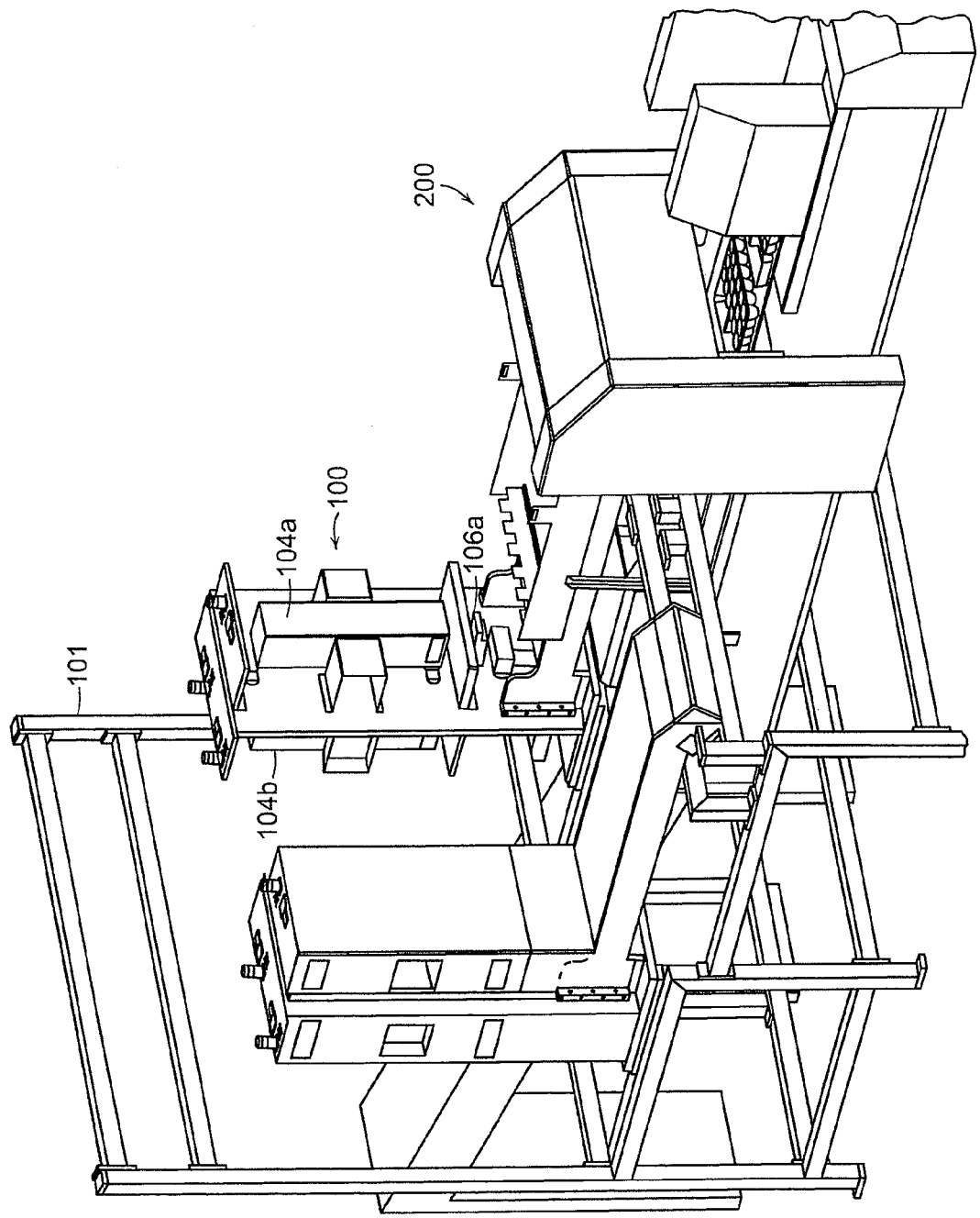

As shown in FIGS. 2 and 3, the egg packing apparatus 200 may comprise a set of two identical egg packers 200a, 200b, each including a conveyor 202a, 202b (e.g., a belt conveyor, roller conveyor, chain conveyor, etc.). Each conveyor 202a, 202b moves empty packages 204 through a respective egg loading section 206a, 206b at which eggs are loaded into them from above, and then moves the filled packages to a respective package closing section 208a, 208b that is responsible for closing the lids of the packages 204. As shown in FIG. 1, eggs may be supplied to the egg packers 200a, 200b via a grader 300. Although only a cross-section of the grader 300 is shown, it should be appreciated that the grader 300 will typically be a fairly large piece of equipment, commonly on the order of 50 or 60 feet long in a direction perpendicular to the packer conveyors.

In the embodiment shown, the laser marking apparatus 100 comprises a pair of identical laser marking systems, one to service each of the two portions 200a, 200b of the egg packer 200. The frame 101 in the illustrated example may, for example, be used to support both portions of the laser marking apparatus 100. Alternatively, separate frames could be used. Because the configuration and operation of the two laser marking systems are essentially the same, only one of the two systems will be described. It should be understood, however, that the following description applies equally to both portions of the laser marking apparatus 100. In should also be appreciated that the existence of two side-by-side laser marking systems is not a requirement of the invention, and that different embodiments may employ fewer or greater numbers of such systems.

In the illustrated embodiment, a main housing 102 of one of the laser marking systems (shown in FIG. 1) contains a group of three laser sources 104a, 104b, 104c. Each laser source 104 may, for example, comprise a carbon dioxide ($CO_2$) laser. As shown, two-to-one beam splitters 106a, 106b, 106c may be used to divide laser energy from the laser sources 104 into multiple beams and minors may be used to direct the resulting six laser beams through a channel of a lower housing 108 (shown in FIG. 1) to a set of six two-dimensional laser-aiming mirrors (galvos) 110. In other embodiments, rather than employing beam splitters, a separate laser source may be employed for each galvo 110. Each galvo 110 may thus, for example, be responsible for lasing two eggs in a package of twelve, or three eggs in a package of eighteen, or more eggs in a larger package.

Electronic control boards 111 contained within the lower housing 108 may include conventional circuitry (analog, digital, etc.) to control the operation of the laser sources 104 and the galvos 110. One or more sensors (not shown in FIGS. 1-4) may also detect the position of egg packages on the conveyor with respect to the galvos 110 and allow the control boards 111 to determine when a given package filled with eggs is in position for lasing. In other embodiments, one or more control boards 111 may additionally or alternatively be located elsewhere in the system for easier accessibility, to allow for better ventilation, etc.

Figure 5A:
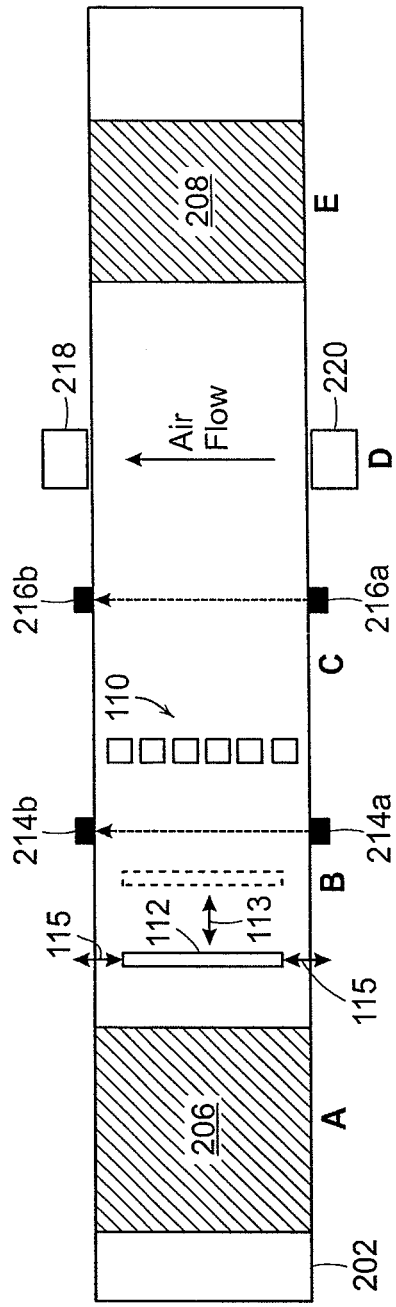
FIGS. 5A and 5B are partial block diagrams of top and side views, respectively, of a portion of the conveyor used by the system shown in FIGS. 1-4 and various components that may operate in conjunction therewith.
Figure 5B:
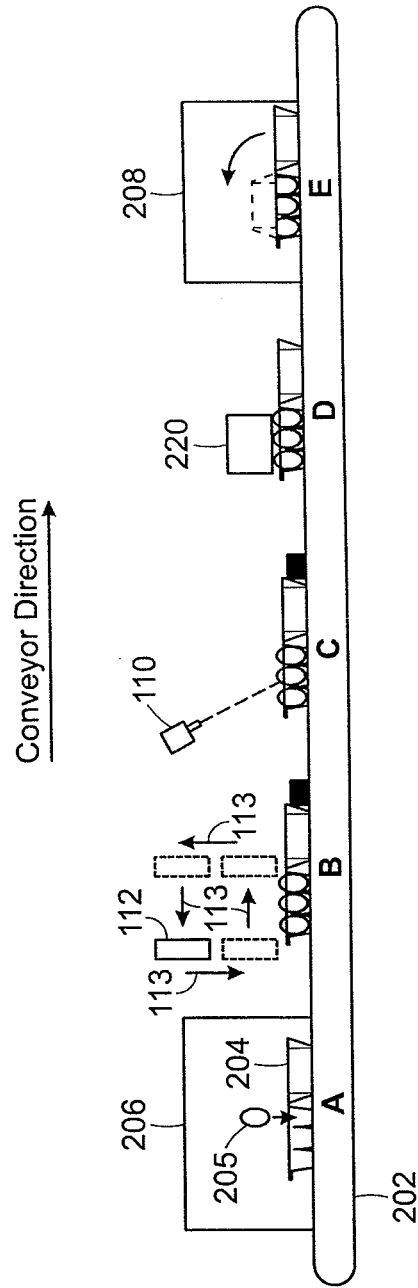

FIGS. 5A and 5B are block diagrams showing, respectively, top and side views of a portion of the conveyor and related components that may be disposed between an egg loading section 206 and a package closing section 208 of one of the two portions of the egg packing apparatus 200 shown in FIGS. 1-4. In the illustrative example shown, the conveyor is controlled so as to move packages 204 sequentially to each of five primary locations A-E. At each such primary location, moreover, the conveyor causes the package 204 to move sequentially through a series of sub-locations equal to the number of rows of eggs 205 in the packages 204 being loaded. This occurs because the egg loading section 206 typically loads one row of six eggs 205 at a time, thus requiring the conveyor 202 to move the package slightly forward prior to loading each new row of eggs. A typical egg packer will process approximately 35 cases of eggs per hour, with each case including 30 dozen eggs. At this rate, the packages may, for example, spend approximately 5 seconds at each of the primary locations A-E before being moved by the conveyor 202 to the next such primary location. The packages may thus, for example, spend approximately 1-2 seconds at each of the sub-locations within each of locations A-E.

In the example shown, the conveyor 202 first moves the package 204 to a primary location A within the egg loading section 206 of the egg packing apparatus 200. As shown, when the package 204 stops at this section, a number of eggs 205 corresponding to the number of receptacles in the package 204 (e.g., twelve, eighteen, or more) are disposed into the package 204. As noted above, the eggs may be loaded one row (e.g., six eggs) at a time, with the conveyor 202 advancing the package 204 slightly to allow for subsequent rows to be loaded.

Figure 6:
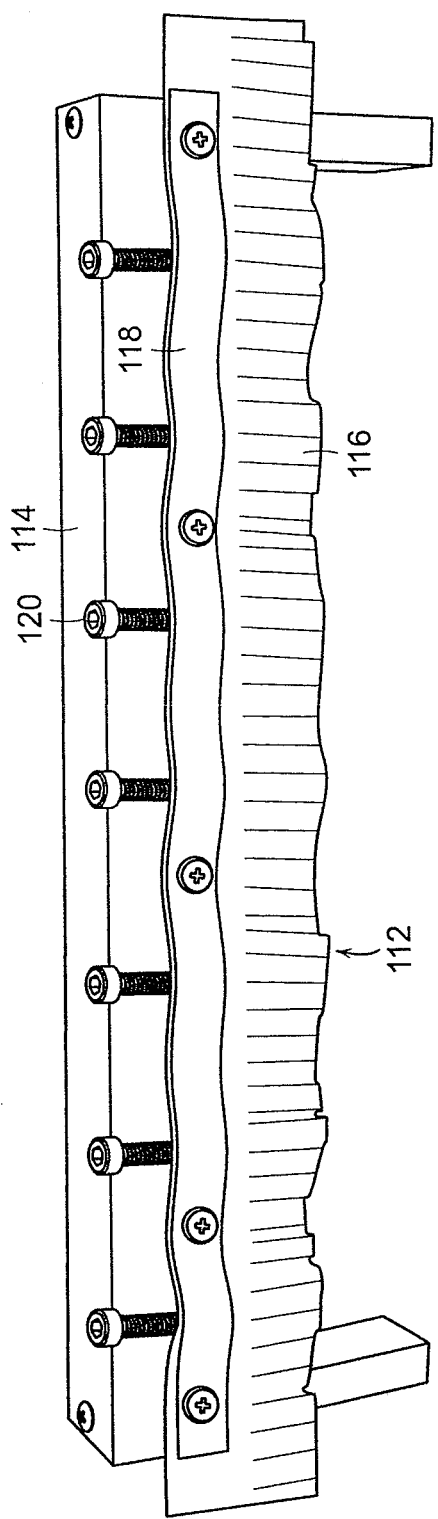
FIG. 6 is a perspective view of an illustrative embodiment of an egg orienter that may be used in a system such as that illustrated in FIG. 5.

Next, the conveyor moves the package 204 to a location B where an operation is performed to orient the eggs to a desired position for laser marking as well as for display to a consumer who ultimately opens the package 204, or perhaps to an inspector or an employee of a retailer or distributor who later examines the eggs for inspection and/or repacking purposes. As shown, the eggs 205 may be oriented in a somewhat haphazard manner within the package at the time they reach the location B. Once they reach the location B, however, an egg orienter 112 may be operated so as to reorient the eggs into the desired position. The egg orienter 112 may be any of numerous devices capable reorienting the eggs within the package, and the invention is not limited to any particular device or structure for performing such a function. One illustrative example of an egg orienter 112 suitable for this purpose is shown in FIG. 6. It should be appreciated that the egg orienter 112 may be located at any of numerous positions along the conveyor 202 and need not be located the particular location shown. In some embodiments, for example, the equipment at the positions B and C in FIGS. 5A and B may be combined so as to operate on cartons of eggs located at the same position. Additionally, in some embodiments, the egg orienter 112 may be positioned to the right of the galvos 110 shown in FIGS. 5A and 5B rather than to the left thereof.

As illustrated by arrows 113 adjacent the egg orienter 112 in FIGS. 5A and 5B, the egg orienter 112 may first be moved (e.g., using via a pneumatic piston or another suitable actuator or motor—not shown in FIGS. 5A and B) down behind the egg package 204 and then may be swept forward (in the direction of normal belt movement) across the rows of eggs 205 (typically two or three rows of six eggs each).

As illustrated by arrows 115 in FIG. 5A, as it is moved forward, the egg orienter 112 may also be shimmied (e.g., using a rotating pneumatic actuator or another suitable actuator or motor—not shown in FIGS. 5A and B) in a side-to-side fashion so as to help overcome the friction between the eggs 205 and the receptacles of the package 204. Finally, the egg orienter 112 may be raised and then moved back to its starting position until another row of eggs is moved into location B for processing. In some embodiments, the egg orienter 112 may be swept across the entire package of eggs in a single pass. Alternatively, it may be swept across one row of eggs 205 at a time each time the package 204 is moved to a new sub-location within location B.

As shown in FIGS. 5A and 5B, one or more sensors (e.g., photo eyes 214a-b) may be used, either alone or together with a belt tick monitor or the like, to track the precise position of the egg package 204 with respect to the egg orienter 112.

Figure 10A:
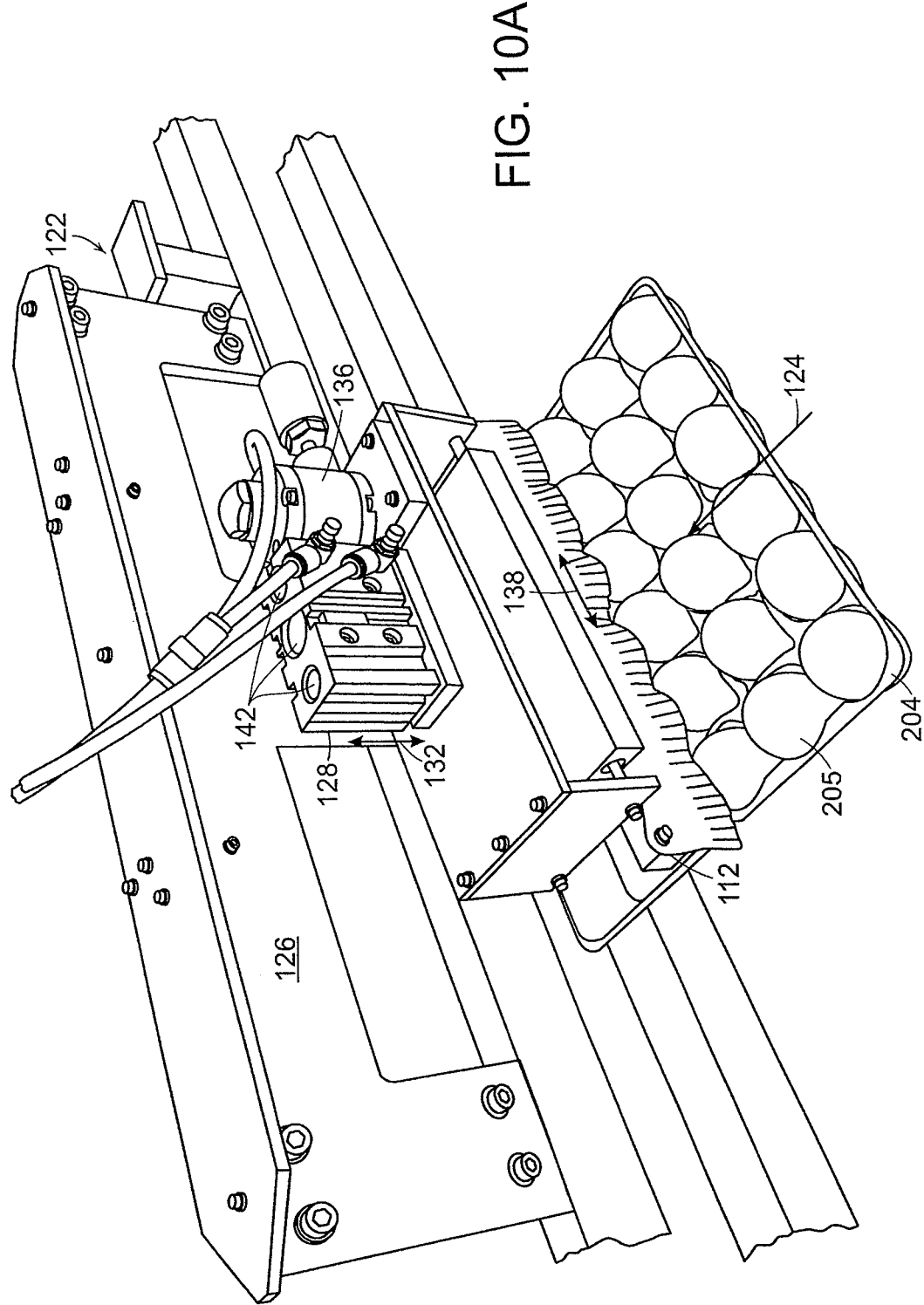
FIGS. 10A and 10B show perspective views of the two sides of a driving mechanism that may be used to move the egg orienter of FIG. 6 in a desired manner.
Figure 10B:
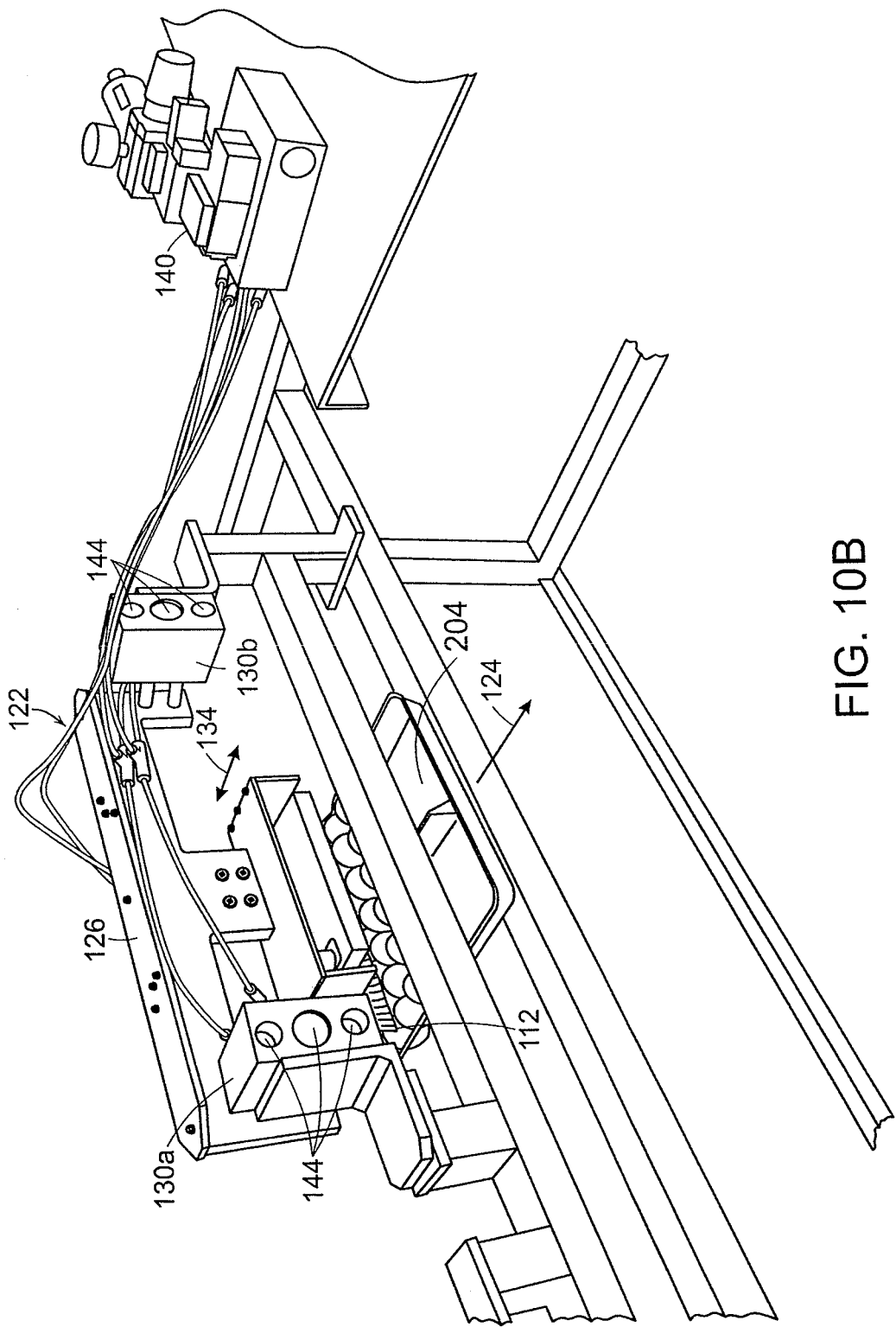

An example of a driving mechanism 122 that may be used to move the egg orienter 112 in a desired manner (e.g., as indicated by the arrows 113, 115 in FIGS. 5A and B) is shown in FIGS. 10A and 10B. The driving mechanism 122 may, for example, straddle the conveyor 202 at the location B (see FIGS. 5A-B) so that packages of eggs pass underneath the egg orienter 112 in a direction indicated by the arrow 124 in FIGS. 10A-B. As shown, the driving mechanism 122 may comprise a frame 126 that supports several double-acting pneumatic cylinders 128, 130a, 130b as well as a rotating pneumatic actuator 136. In the example shown, the pneumatic cylinder 128 and associated pistons 142 are responsible for moving the egg orienter 112 up and down (i.e., perpendicular to a plane of the conveyor 202) as indicated by the arrow 132 in FIG. 10A. Similarly, in the embodiment shown, the pair of pneumatic cylinders 130a and 130b and associated pistons 144 are responsible for moving the orienter 112 forward and backward over an egg package 204 (i.e., parallel to the direction of conveyor motion (see arrow 124)), as indicated by the arrow 134 in FIG. 10B. Also, in the embodiment shown, the rotating pneumatic actuator 136 is responsible for causing the egg orienter 112 to shimmy slightly from side to side as the egg orienter 112 is swept over the package 204 of eggs 205, as indicated by the arrow 138 in FIG. 10A.

As shown in FIG. 10B, the pneumatic components of the driving mechanism 122 may be connected to a compressor unit 140 (or other source of compressed air) that may be controlled so as to regulate the air flow to such components and thereby appropriately control their operation. Of course, embodiments that employ other types of actuators or motors (e.g., electric or hydraulic actuators or motors) may employ different types of control units to regulate movement of the egg orienter 112 in the desired manner.

As shown in FIG. 6, the egg orienter may comprise a frame 114 made of a suitable light-weight, sturdy material (e.g., aluminum) and a brush element 116 for sweeping across the tops of the eggs 205 in the package 204 to reorient them into the desired position. The brush element 116 may, for example, comprise a set of flexible but resilient fingers made of a suitable food-grade plastic, rubber, or other material. In the example shown, the brush element 116 is fastened to the frame 114 using a scallop-shaped aluminum member 118 to impart to the brush element 116 a corresponding scallop shape. Shaping the brush element 116 in this way allows nooks of the scallop shape to appropriately position the eggs 205 into the desired left-to-right position within the package 204.

In the embodiment shown, the egg orienter 112 further includes a set of tubes 120 disposed between nooks of the scallop shaped aluminum member 118 and the frame 114. As shown, the tubes 120 may be arranged such that a pair of them straddles each egg 205 as the egg orienter 112 is swept across the tops of the eggs 205 in the package 204. Advantageously, a high-velocity air source (not shown) may be connected to the tubes 120 such that air may be blown onto and around the eggs 205 as the egg orienter 112 sweeps over the eggs 205 to reposition them. Blowing air over and around the eggs in such a fashion can help dry the surface of the eggs 205 uniformly prior to laser marking them and may also help overcome the friction between the bottoms of the eggs 205 and the package receptacles by creating a slight cushion of air between them.

Figure 7B:
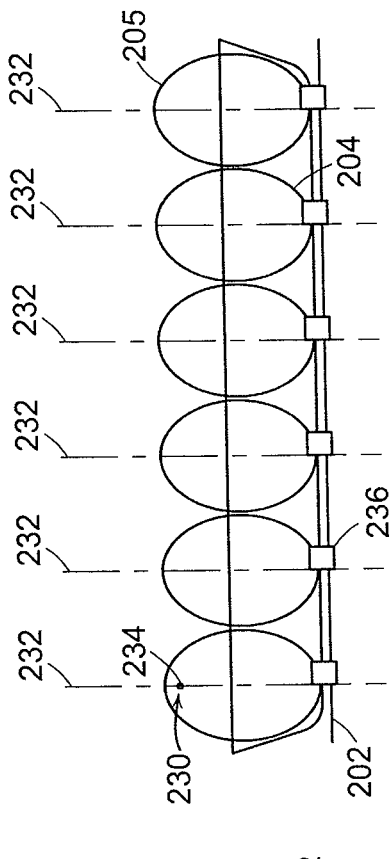
FIGS. 7A and 7B illustrate side and front views, respectively, of an egg package containing eggs as it may appear after it has been processed by an egg orienter such as that shown in FIGS. 5 and 6.
Figure 7A:
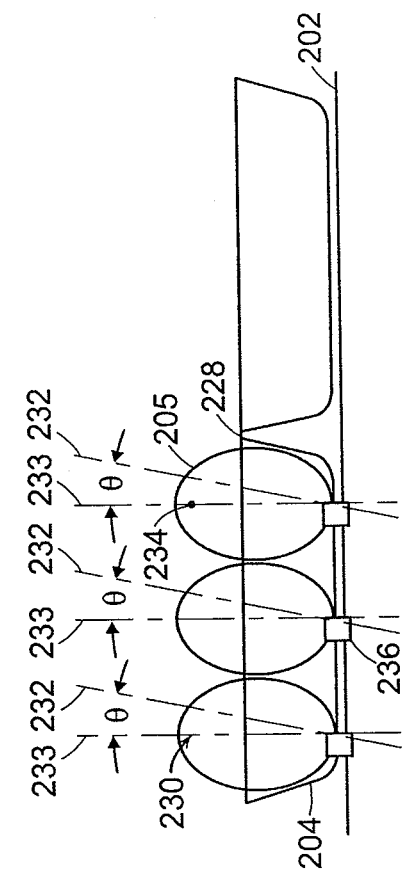

In the illustrative embodiment shown, after the egg orienter 112 has repositioned the eggs 205 within the package 204, the conveyor 202 moves the package 204 to a location C at which a laser marking operation may be performed. FIGS. 7A and 7B illustrate how a group of eggs 205 may be oriented within a package 204 when the package 204 reaches the location C (as well as when the eggs ultimately reach a store, an end consumer, or some other post-packing location). FIG. 7A is a side view and FIG. 7B is a front view of a package 204 in which the eggs have been so oriented.

As shown, as a result of the processing by the egg orienter 112, the eggs 205 may be arranged uniformly within the package 204, with each egg 205 being tilted slightly toward the back 228 of the package 204 (see FIG. 7A) so that a large portion 230 of its surface area is exposed to the galvo 110 responsible for marking on it. In some embodiments, for example, the egg orienter 112 may manipulate the eggs 205 such that a long axis 232 of each egg is tilted at least slightly toward the back 228 of the package. For example, in certain embodiments, the egg orienter 112 may manipulate the eggs such that a long axis of each egg is offset from vertical (with "vertical" being defined as a line 233 normal to a plane coincident with a bottom portion 236 of the package (which, in FIGS. 7A and 7B, is parallel to the surface of the conveyor 202)) by an angle Θ that is a minimum of 3 degrees. In other embodiments, each of the eggs 205 in the each carton 204 may be offset from vertical by an angle Θ that is a minimum of 1 degree, or a minimum of 2 degrees, or a minimum of 4 degrees, or a minimum of 5 degrees, or a minimum of 6 degrees, or a minimum of 7 degrees, or a minimum of 8 degrees, or a minimum of 9 degrees, or a minimum of 10 degrees, or a minimum of 11 degrees, or a minimum of 12 degrees, or a minimum of 13 degrees, or a minimum of 14 degrees, or a minimum of 15 degrees, or a minimum of 16 degrees, or a minimum of 17 degrees, or a minimum of 18 degrees, or a minimum of 19 degrees, or a minimum of 20 degrees, or a minimum of 21 degrees, or a minimum of 22 degrees, or greater. In some embodiments, the egg orienter 112 can manipulate the eggs 205 so that such angle Θ for each egg is approximately 10 degrees, or some other suitable angle that maximizes the surface area that is made available to the laser marking apparatus for writing.

As shown in FIG. 7B, the egg orienter 112 may additionally orient the eggs 205 so that the long axes 232 of all of the eggs in each row of six eggs form approximate right angles with respect to a line intercepting the bottoms of the receptacles holding the eggs in such a row. In some implementations, the long axes 232 of all of the eggs in a given package may be oriented such that each such long axis 232 is no more than about 20 degrees (or, in some embodiments, no more than about 25 degrees, or no more than about 24 degrees, or no more than about 23 degrees, or no more than about 22 degrees, or no more than about 21 degrees, or no more than about 19 degrees, or no more than about 18 degrees, or no more than about 17 degrees, or no more than about 16 degrees, or no more than about 15 degrees, or no more than about 14 degrees, or no more than about 13 degrees, or no more than about 12 degrees, or no more than about 11 degrees, or no more than about 10 degrees, or no more than about 9 degrees, or no more than about 8 degrees, or no more than about 7 degrees, or no more than about 6 degrees, or no more than about 5 degrees, or no more than about 4 degrees, or no more than about 3 degrees, or no more than about 2 degrees, or no more than about 1 degree) offset from any other such long axis.

Figure 8:
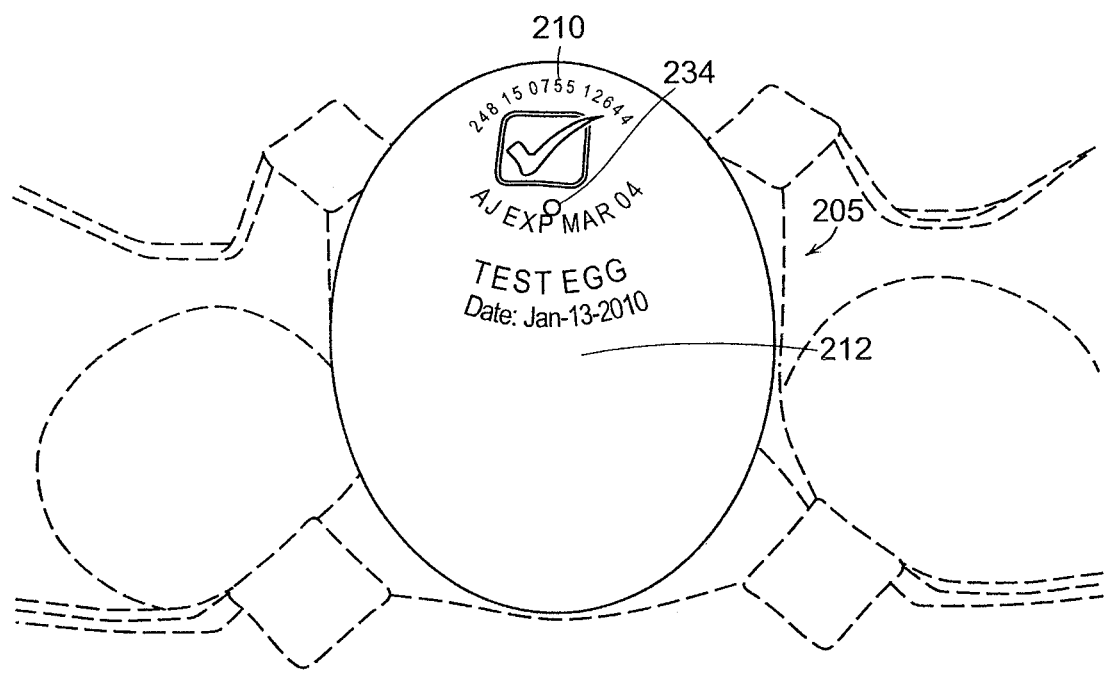
FIG. 8 is an illustration of a front view of an egg as it may appear when marked using one or more the techniques described herein.

When the eggs 205 are oriented within the package 204 in such a manner, the surface of the egg 205 that is immediately apparent to someone opening the package is neither an end nor the middle of the egg 205, but rather a section of the egg somewhere between those two points. FIG. 8 shows an example of an egg 205 having laser marking on it. As shown, a point 234 in the center of the marking (also shown in FIGS. 7A and 7B) may be located between an end 210 and the middle 212 (i.e., the area located mid-way between the egg's two ends) of the egg 205. In some embodiments, the information marked on the egg may extend from the end 210 of the egg (or beyond) to the middle 212 of the egg (or beyond). As shown in FIG. 8, the information may be marked on the egg so as to extend horizontally with respect to the egg's long axis. In some embodiments, information may additionally or alternatively be marked so as to extend vertically generally in a direction of the egg's long axis. In some embodiments, the information laser marked on each egg may comprise one or more of a company's logo, an expiration date, grading information, and packing codes (e.g., a state code, a county code, a packer code and/or a Julian date).

In some embodiments, eggs may be oriented in each package and information may be marked on the eggs in such a way that the information marked on all of the eggs in each package can be viewed immediately upon opening the package, without requiring a human being to manipulate any of the eggs to allow such information to be viewed. It is known that a significant percentage the eggs that are produced have the salmonella virus on them. For this and other reasons, various regulations exist governing when and how eggs may be manipulated. Allowing inspection of laser marked information on all of the eggs in a given package without needing to manipulate any of the eggs in the package can thus provide significant advantages.

In the illustrative embodiment shown in FIGS. 1-6, during each interval of approximately 1-2 seconds wherein the package is at a sub-location within the primary location C, each of the six galvos 110 may be controlled to mark on a respective one of six eggs in a given row. Accordingly, in some implementations, each galvo 110 may have approximately 1-2 seconds to complete the marking on each egg 205 for which it is responsible. As shown in FIGS. 5A and 5B, one or more sensors (e.g., photo eyes 216a-b) may be used, either alone or together with a belt tick monitor or the like, to track the precise position of the egg package 204 with respect to the galvos 110.

In some embodiments, a vector-based process may be used to laser mark on the eggs 205. In other embodiments, however, a dot matrix, raster, or other laser marking process may additionally or alternatively be employed. In some embodiments, each egg 205 may be marked during the available marking interval of approximately 1-2 seconds.

In some embodiments, the image to be marked on the eggs may be digitally processed (e.g., pre-distorted) in advance of lasing the eggs 205 to account for the actual or expected curvature of the eggs in question. Taking such a step may result in an image that does not appear distorted in spite of being marked onto a non-planar surface.

In some implementations, one or more additional laser sources and/or galvos may be also be arranged and configured to mark on one or more different portions of the egg, e.g., a back side, in addition to the front-side location discussed above. In some embodiments, for example, it may be desirable to mark certain information of immediate importance to a consumer, e.g., an expiration date and/or brand identification, on a front portion of the eggs so that such information is immediately visible to a consumer upon opening the box, and to mark other information of less immediate importance, e.g., tracking codes or the like, on the back side of the eggs.

As shown in FIGS. 5A and 5B, after the laser marking process is complete for a given package 204, the conveyor 202 may move the package 204 to a location D at which a vacuum 218 nozzle connected to a vacuum source (not shown), together with a blower nozzle 220 connected to a air source (not shown), may be used to remove dust generated by the lasing process and any other unwanted particles from the packages of eggs before they are closed by the package closing section 208 of the egg packer 200. In some embodiments, the vacuum source and/or the air source may be located apart from the laser marking apparatus 100 (e.g., on a roof of a building in which the apparatus 100 is located) and connected to the nozzles 218, 220 via appropriate tubes or ductwork (not shown).

In some implementations, a machine vision system 146, 148 (shown in FIG. 1) may be configured and arranged so as to examine the position and/or characteristics of the eggs that are to be marked and/or the quality and integrity of the information that is marked onto the eggs. As shown in FIG. 1, in some embodiments, one or more machine vision observation units 146 may, for example, be disposed adjacent beam projectors 148 of one or more galvos. In other embodiments, the one or more observation units 146 may be located elsewhere to allow for adequate observation. The one or more observation units 146 may be connected to one or more machine vision inspection system computers 148 using any suitable technique. Each of the one or more machine vision inspection computers 148 may be local to the system 100 or may be in a remote location.

The egg processing system in question could, for example, be stopped if the machine vision system determines that the mark quality has fallen below a certain threshold. Such a system may be closed-loop in some embodiments, such that feedback from the machine vision system may be used to control the galvos 110 and/or the laser sources 104 so as to improve the quality and reliability of the process. For example, feedback from a machine vision system might adjust the number of passes made by the galvos, the rate at which the galvos scan, the power level of the laser, etc., in order to ensure a desired contrast level is achieved during the laser marking process. Additionally or alternatively, a machine vision system may examine the size, color, or other perceptible properties of the eggs to be marked and make appropriate adjustments to the laser marking components and/or process to account for such variables and thereby ensure that image quality stays consistent in spite of such variations.

Figure 9:
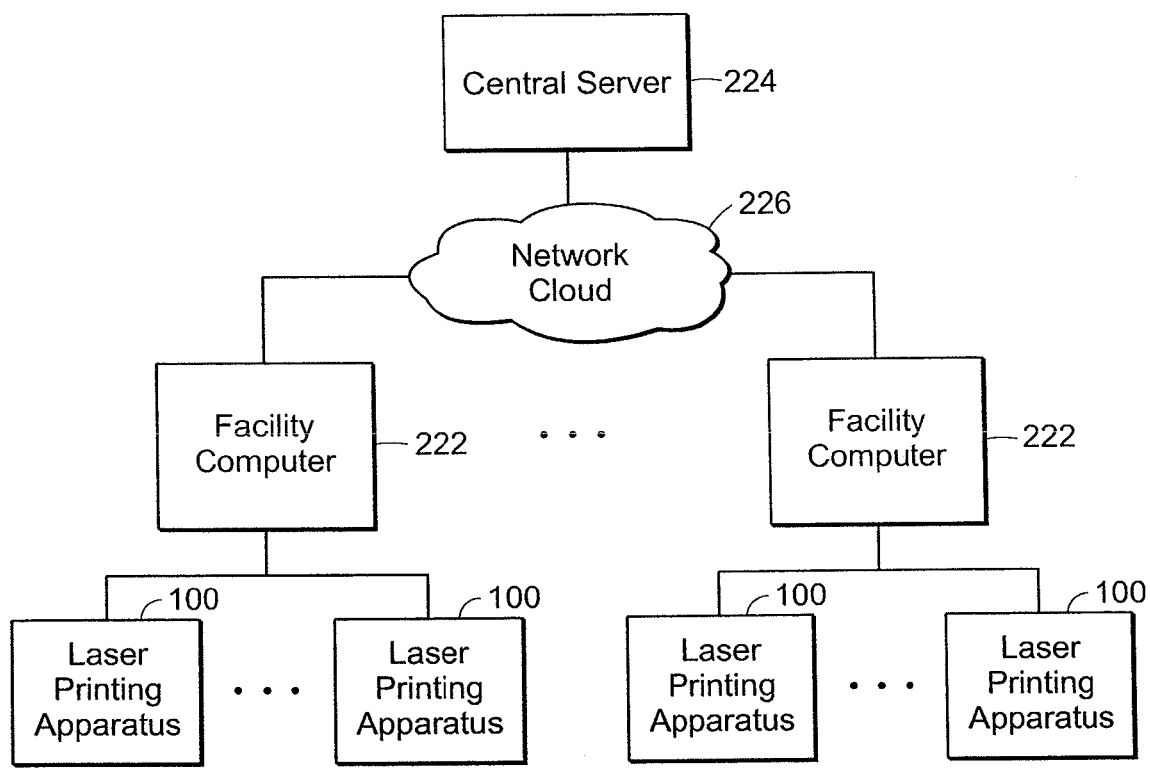
FIG. 9 is a block diagram showing components of a computer network that may be employed to allow for centralized control of laser marking apparatuses located at different facilities.

In some embodiments, it may be useful to allow for centralized control and monitoring of the operation of multiple different laser marking apparatuses 100 distributed throughout one or more facilities. FIG. 9 illustrates an example of a system that would allow for such centralized control. As shown, respective groups of laser marking apparatuses 100 may be coupled to corresponding facility computers 222 so as to allow the facility computers to control the queuing of laser marking jobs to the control boards 111 of the various laser marking apparatuses 100 as well as to monitor the health and status of such apparatuses. Laser marking apparatuses 100 may thus behave essentially as network printers for the facility computers 222. Each facility computer 222 may, for example, be located at a respective egg processing facility.

Central server 224 may, in turn, be coupled via a network cloud 226 to the group of facility computers 222 to allow the central server 224 to distribute laser marking jobs to the various facility computers 222 and to monitor the status of those jobs. The network cloud 226 may comprise any of a number of network types, and may be distributed either over a local or wide area. In some embodiments, the network cloud 226 may, for example, comprise the Internet. When facilities are located in different geographic regions, different laser marking jobs may, for example, be distributed to the facility computers 222 at the different facilities depending on the region. If, for example, Major League Baseball decided to contract to have team logos marked on eggs, instructions could be sent to the facilities that distribute eggs to the New England area to mark the logo of the Boston Red Sox on a given number of eggs at those facilities whereas instructions could be sent to facilities that distribute eggs in the state of Florida to mark the logo of the Florida Marlins on a certain number of eggs at those facilities.

In some embodiments, the galvos 110 may be independently controlled such that different images may be marked on different eggs in the same package. For example, the galvos 110 could be controlled such two eggs in a first row of a package have the letters "G" and "O" marked on them and six eggs in the second row of the package have the letters "R," "E," "D," "S," "O," and "X" marked on them. In some embodiments, each egg 205 may even be marked with a unique identifier that allows it to be differentiated from every other egg that is laser marked using the system.

Having thus described certain embodiments of systems and methods for practicing aspects of this invention, it is to be appreciated that various alterations, modifications, and improvements will readily occur to those skilled in the art. Such alterations, modifications, and improvements are intended to be part of this disclosure, and are intended to be within the spirit and scope of the invention. For example, in embodiments wherein open egg packages are fed in the opposite direction onto the conveyor 202 shown in FIGS. 5A and 5B, i.e., such that the receptacle section leads the lid section, the loop-wise movement of the egg orienter 112 may be unnecessary, as the appropriate orientation of the eggs within the package 204 could be achieved simply by allowing the open packages of eggs to pass underneath the egg orienter 112 (with or without causing it so shimmy slightly from side-to-side to help overcome friction). In such embodiments, because the tops of the eggs 205 would be caused to be tilted slight to the right (as depicted in FIG. 5B), it would also be desirable to orient the galvos 110 so that they face slightly toward the back of the conveyor 202, thus allowing them to mark onto the large exposed surface area 230 of the eggs 205 obtained using this alternative technique. Accordingly, the foregoing description and drawings are by way of example only.

What is claimed is:

1. A system for marking eggs, comprising:
a plurality of marking apparatuses configured and arranged to perform marking jobs queued by local computers for marking eggs being packed by egg packing stations; and
a server, coupled to the local computers, configured to distribute the marking jobs to the local computers.

2. The system of claim 1, wherein the server is coupled to the local computers via the Internet.

3. The system of claim 1, wherein the marking jobs comprise laser marking jobs, and wherein the plurality of marking apparatuses comprise a plurality of laser marking apparatuses.

4. The system of claim 3, wherein the plurality of laser marking apparatuses comprise a first laser marking apparatus at a first egg processing facility and a second laser marking apparatus at a second egg processing facility located remotely from the first egg processing facility.

5. The system of claim 3, wherein the server is configured by stored program instructions to:
distribute a first laser marking job to a first local computer at a first egg processing facility, the first laser marking job comprising data representing one or more first indicia to be marked; and
distribute a second laser marking job to a second local computer at a second egg processing facility different from the first egg processing facility, the second laser marking job comprising data representing one or more second indicia to be marked, the one or more second indicia being different from the one or more first indicia.

6. The system of claim 5, wherein the server is further configured by stored program instructions to:
select the one or more first indicia to be marked based at least in part on a geographical region to which eggs processed by the first processing facility are to be distributed.

7. The system of claim 3, wherein the server is further configured by stored program instructions to monitor a status of at least one laser marking job distributed to at least one local computer.

8. The system of claim 3, wherein at least one laser marking job comprises data representing one or more indicia to be marked and a quantity of eggs on which the one or more indicia are to be marked.

9. The system of claim 8, wherein at least one laser marking job comprises data representing first and second indicia to be marked on, respectively, first and second eggs in a same package of eggs, the first indicium being different from the second indicium.

10. The system of claim 9, wherein the first and second indicia belong to a same message to be conveyed to a person handling the package of eggs.

11. The system of claim 10, wherein:
the message comprises a textual message;
the first indicium comprises a character from a first word in the textual message; and
the second indicium comprises a character from a second word in the textual message, the second word being different from the first word.

12. A method for controlling marking jobs, comprising an act of:
(a) with a server, distributing the marking jobs from the server to local computers responsible for queuing marking jobs to one or more marking apparatuses configured and arranged to mark information on eggs.

13. The method of claim 12, wherein the act (a) comprises distributing the marking jobs from the server to the local computers via the Internet.

14. The method of claim 12, wherein the marking jobs comprise laser marking jobs, and wherein the one or more marking apparatuses comprise one or more laser marking apparatuses.

15. The method of claim 14, wherein the one or more laser marking apparatuses comprise a first laser marking apparatus at a first egg processing facility and a second laser marking apparatus at a second egg processing facility located remotely from the first egg processing facility.

16. The method of claim 14, wherein the act (a) comprises:
distributing a first laser marking job to a first local computer at a first egg processing facility, the first laser marking job comprising data representing one or more first indicia to be marked; and
distributing a second laser marking job to a second local computer at a second egg processing facility different from the first egg processing facility, the second laser marking job comprising data representing one or more second indicia to be marked, the one or more second indicia being different from the one or more first indicia.

17. The method of claim 16, further comprising an act of:
selecting the one or more first indicia to be marked based at least in part on a geographical region to which eggs processed by the first processing facility are to be distributed.

18. The method of claim 14, further comprising an act of:
monitoring a status of at least one laser marking job distributed to at least one local computer.

19. The method of claim 14, wherein at least one laser marking job comprises data representing one or more indicia to be marked and a quantity of eggs on which the one or more indicia are to be marked.

20. The method of claim 19, wherein at least one laser marking job comprises data representing first and second indicia to be marked on, respectively, first and second eggs in a same package of eggs, the first indicium being different from the second indicium.

21. The method of claim 20, wherein the first and second indicia belong to a same message to be conveyed to a person handling the package of eggs.

22. The method of claim 21, wherein:
the message comprises a textual message;
the first indicium comprises a character from a first word in the textual message; and
the second indicium comprises a character from a second word in the textual message, the second word being different from the first word.

* * * * *